W. A. PEARSON.
WIND SHIELD FOR AUTOMOBILES.
APPLICATION FILED APR. 16, 1910.
1,032,857.
Patented July 16, 1912.
3 SHEETS—SHEET 1.
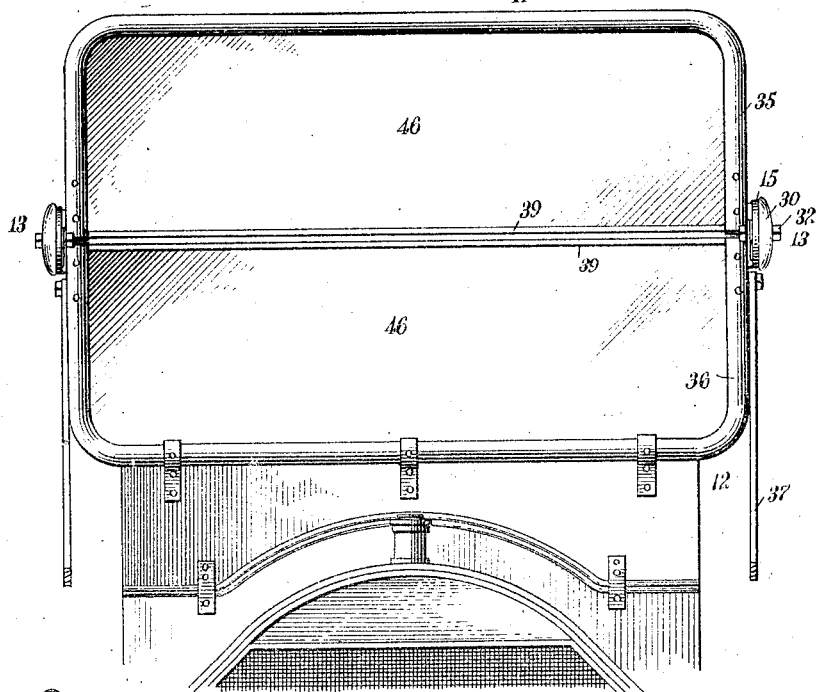
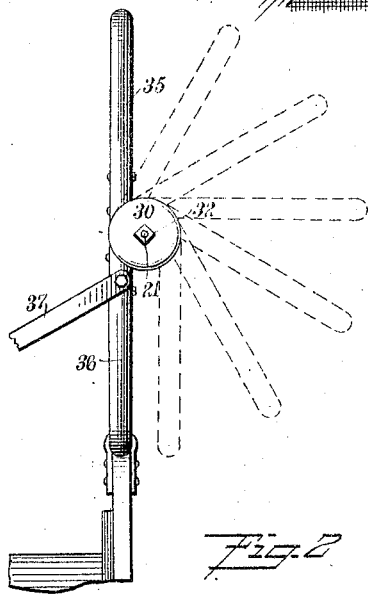
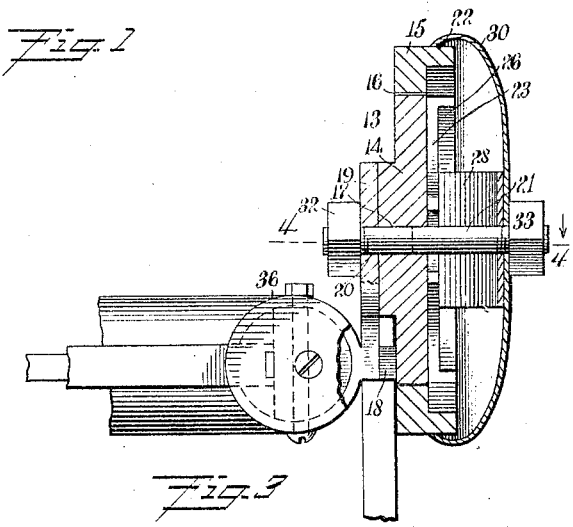
WITNESSES:
E. G. Bromley.
E. B. Marshall
INVENTOR
Willis A. Pearson
BY Munn & Co.
ATTORNEYS W. A. PEARSON.
WIND SHIELD FOR AUTOMOBILES.
APPLICATION FILED APR. 16, 1910.
1,032,857.
Patented July 16, 1912.
3 SHEETS—SHEET 2.
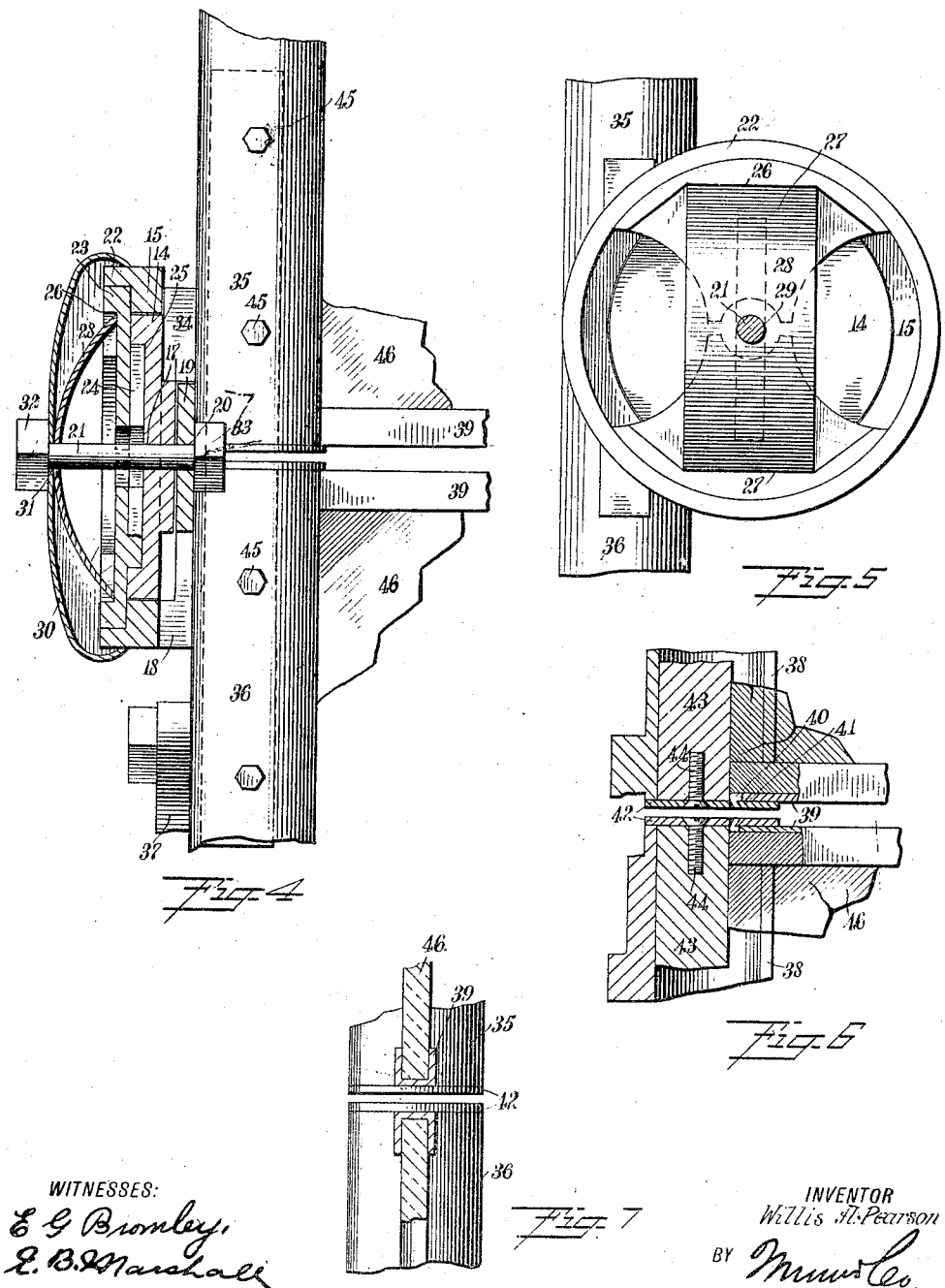

W. A. PEARSON.
WIND SHIELD FOR AUTOMOBILES.
APPLICATION FILED APR. 16, 1910.
1,032,857.
Patented July 16, 1912.
3 SHEETS—SHEET 3.
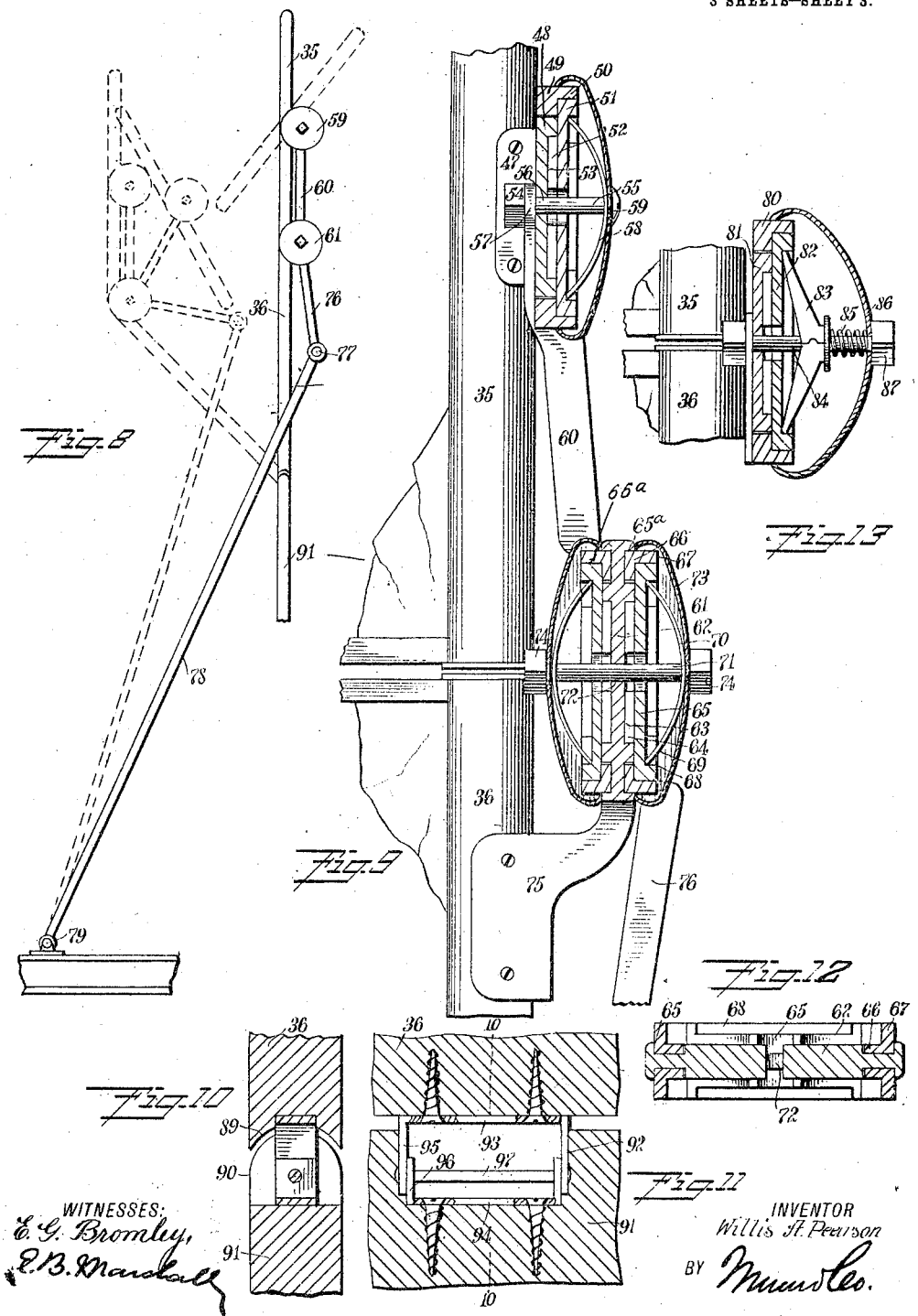
WITNESSES:
E. G. Bromley,
E. B. Marshall
INVENTOR
Willis A. Pearson
BY Munn & Co.
ATTORNEYS

UNITED STATES PATENT OFFICE.

WILLIS A. PEARSON, OF TROY, OHIO.

WIND-SHIELD FOR AUTOMOBILES.

1,032,857.     Specification of Letters Patent.     Patented July 16, 1912.

Application filed April 16, 1910. Serial No. 555,937.

*To all whom it may concern:*

Be it known that I, WILLIS A. PEARSON, a citizen of the United States, and a resident of Troy, in the county of Miami and State of Ohio, have invented a new and Improved Wind-Shield for Automobiles, of which the following is a full, clear, and exact description.

My invention relates to wind shields adapted to be used on automobiles, and it has for its object to provide one having hinge members, which are held yieldingly relatively to each other by springs, so that the members of the wind shield may be disposed in a plurality of positions relatively to each other and be supported relatively to the hinge members.

Another object of the invention is to provide frames for the wind shield, having channel members which are inserted in openings in tubular side bars, the tubular side bars having slots in which the edges of the transparent or glass members are disposed, the other edges of the glass or transparent members being also disposed in the channel members.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views, and in which—

Figure 1 is a front elevation of my wind shield mounted on an automobile; Fig. 2 is a side elevation of the wind shield shown in Fig. 1; Fig. 3 is a sectional plan view of the hinge members shown at one side of the frame of the wind shield in Fig. 1, and means for connecting one of the hinge members with the lower frame; Fig. 4 is a sectional view on the line 4—4 of Fig. 3; Fig. 5 is a side elevation of the same; Fig. 6 is a fragmentary view showing the manner of constructing the members of the frame of the wind shield where they abut; Fig. 7 is a side elevation of the same, looking from the right; Fig. 8 is a side elevation of a modification of the invention; Fig. 9 is an enlarged view showing this modification, the hinge members being shown in section; Fig. 10 is a sectional view on the line 10—10 of Fig. 11; Fig. 11 is a side elevation of the construction shown in Fig. 10; Fig. 12 is a sectional plan view of the lower hinge members shown in the modification in Fig. 9; and Fig. 13 is a sectional view showing a modification of the invention.

By referring to the drawings, it will be seen that the machine has two frame members 11 and 12, which are connected at each side by hinges 13. These hinges 13 have two hinge members 14 and 15, the hinge member 15 having a central opening 16 in which is disposed the hinge member 14. The hinge member 14 has a central bearing 17, and the hinge member 15 has an inwardly-projecting member 18, and a bearing member 19, in which there is a bearing 20, a bolt 21 being disposed in these bearings 17 and 20. The hinge member 15 has an annular flange 22, which is preferably integral therewith, this annular flange 22 forming a shoulder which is engaged by dogs 23. The dogs 23, two in number, are disposed at opposite sides of the bolt 21, as is best shown in Fig. 5 of the drawings, and they have projections or guides 24, which travel in guideways 25 serving as shoulders in the hinge member 14. It will therefore be seen that the dogs 23 are prevented from rotating relatively to the hinge member 14, although they may travel radially relatively to the said member. The dogs 23 have shoulders 26 therein, which are engaged by the terminals 27 of a leaf spring 28, the leaf spring 28 having an orifice 29, through which the bolt 21 is disposed. A head 30 of spun metal is provided, the head 30 having an orifice 31 through which the bolt 21 is disposed, the bolt 21 having a nut 32 which is adapted to engage the head 30 and press it and the spring 28 downwardly, so that the terminals 27 of the spring 28 will engage the shoulders 26 of the dogs 23 and will press the dogs against the annular flange 22 of the hinge member 15. The bolt 21 has a head 33, which is adapted to engage the outer side of the bearing member 19. The hinge member 14 has a lug 34, which is secured to the tubular side bar 35 of the upper frame 11. The hinge member 15 has its set-off or inwardly-projecting member 18 secured to the side tubular bar 36 of the lower frame 12. A brace 37 is pivoted to the tubular side bar 36. It will be understood that there are two of these hinges 13 and that they are both constructed as has been described, and that there are two pivoted brace bars 37, one disposed in each side of the wind shield.

The tubular side bars 35 and 36 have vertical grooves 38, in which are disposed channel members 39, the channel members 39 having lugs 40, which project through openings 41 in heads 42, which are disposed across the abutting terminals of the tubular side bars 35 and 36. These heads 42 are secured to members 43 by screws 44, the members 43 being secured to the tubular side bars 35 and 36 by screws 45, which pass through orifices in the tubular side bars and engage the members 43. Glass or other transparent members 46 of the wind shield, have their edges disposed in the slots 38 in the tubular side bars 35 and 36 and in the channel members 39, the glass or transparent members 46 also being disposed in the grooves, which are extended horizontally across the frame at the top of the upper frame 11 and at the bottom of the lower frame 12. It will be seen that, by removing the screws 45, the heads 42 may be removed from the tubular side bars 35 and 36, and that the heads 42 will carry with them the channel members 39, which will readily permit the insertion of the glass or other transparent members 46, after which the heads 42 with the channel members 39, are replaced and are secured as has been described.

Figs. 8, 9 and 12 show a modified form of my invention. In this modified form, plates 47 are secured to each of the upper tubular side bars 35, inner hinge members 48 being secured to these plates 47 respectively, the outer hinge members 49 having central openings in which the hinge members 48 are disposed. The outer hinge members 49 also have annular flange members 50, which are adapted to be engaged by dogs 51, which have guides or projections 52, which travel in radially-disposed grooves or guideways 53. Lugs 54 project from the plates 47 and have threaded orifices, in which are disposed threaded terminals of the screws 55, the screws 55 being journaled in bearings 56 in the hinge members 48 and in bearings 57, which project from and are integral with the hinge members 49. A leaf spring 58, having an opening 59, through which the screw 55 is disposed, engages shoulders on the dogs 51 in the same manner as I have described with reference to the construction shown in Figs. 1, 2, 3, 4 and 5 of the drawings. The hinge members 49 are secured rigidly to bars 60, which are in turn secured rigidly to one of the hinge members of a hinge 61. This hinge 61 has a central member 62, having radially-disposed grooves or guideways 63 in which projections 64 on dogs 65, travel. The central hinge members 62 have annular side grooves 65$^a$, in which are disposed annular members 66 and 66$^a$, the annular member 66$^a$ being secured to the bars 60. These annular members 66 and 66$^a$ have shoulders 67, which are engaged by the dogs 65, the dogs 65 having shoulders 68, in which are disposed terminals 69 of leaf springs 70, the leaf springs 70 having orifices through which the bolts 71 are disposed. The bolts 71 are also journaled in bearings 72 in the central hinge members 62. The bolts 71 also extend through openings in the spun metal heads 73, so that when the nuts 74 are turned home, they will press the heads 73 against the springs 70 and will force the terminals of the springs 70 against the shoulders of the dogs 65, thereby thrusting the dogs against the annular shoulders 67, these annular shoulders 67 and the members 66 forming the hinge member which is secured to the bars 60. The central hinge members 62 are secured to the lower tubular side bars 36 by plates 75. The hinge members, formed of the annular members 66, are secured to a bar 76, which is pivoted at 77 to a brace 78, the brace 78 being adapted to be pivoted at 79 to the automobile.

In the construction shown in Fig. 13 of the drawings, the hinge members 80 and 81 are constructed and are secured to the tubular side bars 35 and 36 in the manner which has been described. Dogs 82 are also constructed and are mounted in the manner which has been described, but instead of using the leaf springs, such as I have described, I pivot together two members 83 around a bolt 84, a coil spring 85 being mounted on the said bolt 84, against which the spun metal head 86 presses, a nut 87 being provided to press the head 86 inwardly, thereby compressing the spring 85, by which means the pivoted members 83 may be pressed against the shoulders of the dogs 82. The lower frame member 12 of the wind shield is hinged, in any suitable manner, to a member 91, this member 91 being hinged to the automobile in any suitable manner. The lower portion of the tubular side bar 36, as shown in Fig. 10 of the drawings, has a curved recess 89, in which is disposed a rounded upper portion of the frame 91. A recess 92 is made in the upper rounded portion 90 of the frame member 91, bracket members 93 and 94 being secured to the frame members 36 and 91 respectively, these bracket members 93 and 94 having flanges 95 and 96 which are pivoted together by a pin 97, so that the frame member 36 may be removed relatively to the frame member 91. It will be readily understood that when the wind shield is constructed, as has been described, the glass or transparent members 46 may readily be inserted in position by removing the heads 42, with the channel members 39. It will also be understood that the members, which are hinged, are held yieldingly relatively to each other, so that the wind shield will remain in the desired position without the necessity of the usual fastenings it being only necessary to move the upper frame member 11 relatively to the lower frame member, the hinge members 14, secured to the upper frame, being held relatively to the hinge members 15 secured to the lower frame member 12 by means of the springs. However, while these springs will prevent the upper frame from moving relatively to the lower frame, except when desired, it will not prevent the operator of the car from pulling or pushing the upper frame 11 to the desired position.

In the modification shown in Figs. 8, 9, 10 and 12 of the drawings, it is possible not only to move the upper frame relatively to the lower frame on an axis which corresponds with the bottom of the upper frame, but it is also possible to rotate the upper frame 11 relatively to the lower frame 12 on an axis at any desired distance above the bottom of the upper frame, the upper frame 11 being held in position, when adjusted as desired, by means of the leaf springs 58 and 70 of the hinges, these springs actuating dogs, which are prevented from being rotated relatively to one set of hinge members and which engage the other hinge members respectively.

In Fig. 13 of the drawings, the dogs 82 are held extended by means of the pivoted members 83 which are in turn held against the shoulders of the dogs by means of the spring 85, the operation of this modification being substantially the same as in the other forms of my invention.

Having thus described my invention, I claim as new and desire to secure by Letters Patent:

1. In a wind shield for automobiles, two hinge members adapted to be moved relatively to each other, and having central bearings, a bolt journaled in the bearings, a dog having surfaces disposed against the hinged members, a spring for pressing the dog against the two hinge members, and means on the bolt which engage the spring.

2. In a wind shield for automobiles two hinge members there being an opening in one of the hinge members, in which the other is disposed, one of the hinge members having a shoulder, a dog disposed against the shoulder and having a face engaging the other hinge member, a central bolt, a leaf spring for holding the dog yieldingly in position, and means mounted on the bolt for engaging the leaf spring.

3. In a wind shield for automobiles two hinge members having bearings respectively, there being an opening in one of the hinge members in which the other is disposed, a bolt journaled in the bearings, a dog disposed against the hinge members, and a leaf spring mounted on the bolt and engaging the dog for holding the dog yieldingly in position.

4. In a wind shield for automobiles a hinge member, a second hinge member having a shoulder, oppositely disposed dogs disposed against the first hinge member, and engaging the shoulder on the second hinge member, a central bolt, and a leaf spring mounted on the bolt and having terminals engaging the dogs.

5. In a wind shield for automobiles a hinge member having a bearing, a second hinge member having a bearing, and a shoulder, there being an opening in one of the hinge members in which the other is disposed, a dog disposed against the shoulder and engaging the other hinge member, a bolt journaled in the bearing, and a leaf spring mounted on the bolt and engaging the dog.

6. In a wind shield for automobiles a hinge member, a second hinge member having a shoulder, a dog having an end disposed against the shoulder on the second-mentioned hinge member, and a surface engaging the first-mentioned hinge member, and a spring for holding the dog yieldingly in engagement with the hinge members.

7. In a wind shield for automobiles, two hinge members having central bearings respectively, there being an opening in one of the hinge members, in which the other is disposed, a flange on the hinge member having the opening, there being a radial groove in the inner hinge member, a dog having a projection disposed in the radial grooves, and a shoulder, for engaging the annular member, a spring which engages the shoulder on the dog for holding the dog yieldingly against the flange, and a bolt journaled in the bearings.

8. In a wind shield for automobiles two hinge members having central bearings respectively, there being an opening in one of the hinge members in which the other is disposed, a flange on the hinge member having an opening there being a radial groove in the inner hinge member, a dog having a projection disposed in the radial groove, and a shoulder, for engaging the annular member, a spring which engages the shoulder on the dog for holding the dog yieldingly against the flange, a bolt journaled in the bearings, and means on the bolt for compressing the spring.

9. In a wind shield for automobiles, two hinge members having central bearings respectively, there being an opening in one of the hinge members, in which the other is disposed, a flange on the outer hinge member, there being radial grooves in the inner hinge member substantially in alinement, two oppositely-disposed dogs having projections disposed in the grooves respectively and shoulders, for engaging the annular flange, a leaf spring having terminals, disposed against the shoulders of the dogs, a bolt journaled in the bearings and disposed through an opening in the leaf spring, and means on the bolt for compressing the leaf spring.

10. In a wind shield for automobiles, two hinge members having central bearings respectively, there being an opening in one of the hinge members, in which the other is disposed, a flange on the outer hinge member, there being radial grooves in the inner hinge member substantially in alinement, two oppositely-disposed dogs having projections disposed in the grooves respectively and shoulders for engaging the annular flange, a leaf spring having terminals, disposed against the shoulders of the dogs, a bolt journaled in the bearings and disposed through an opening in the leaf spring, a head having an opening through which the bolt is disposed, the head engaging the leaf spring at the bolt and the outer hinge member at its periphery, and a nut on the bolt for pressing the head against the leaf spring.

In testimony whereof I have signed my name to this specification in the presence of two subscribing witnesses.

WILLIS A. PEARSON.

Witnesses:
L. H. SHIPMAN,
FLORENCE L. DE FREES.